(12) United States Patent
Nakamura et al.

(10) Patent No.: US 10,393,057 B2
(45) Date of Patent: Aug. 27, 2019

(54) ENGINE CONTROL DEVICE

(71) Applicant: MITSUBISHI JIDOSHA KOGYO KABUSHIKI KAISHA, Tokyo (JP)

(72) Inventors: Nozomu Nakamura, Tokyo (JP); Kensuke Yanagawa, Tokyo (JP); Fumiaki Hiraishi, Tokyo (JP); Masayuki Yamashita, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/549,069

(22) PCT Filed: Feb. 9, 2016

(86) PCT No.: PCT/JP2016/053784
§ 371 (c)(1),
(2) Date: Aug. 4, 2017

(87) PCT Pub. No.: WO2016/158018
PCT Pub. Date: Oct. 6, 2016

(65) Prior Publication Data
US 2018/0023504 A1 Jan. 25, 2018

(30) Foreign Application Priority Data
Mar. 30, 2015 (JP) .................. 2015-068712

(51) Int. Cl.
*F02B 1/00* (2006.01)
*F02D 41/40* (2006.01)
(Continued)

(52) U.S. Cl.
CPC .......... *F02D 41/402* (2013.01); *F02D 41/04* (2013.01); *F02D 41/047* (2013.01); *F02D 41/22* (2013.01);
(Continued)

(58) Field of Classification Search
CPC ..... F02D 41/3094; F02M 51/00; F02M 69/00
(Continued)

(56) References Cited

U.S. PATENT DOCUMENTS 5,797,367 A 8/1998 Iida et al.
2005/0120709 A1 6/2005 Ichise et al.
(Continued)

FOREIGN PATENT DOCUMENTS

EP 1 812 702 A1 8/2007
JP 10-141115 A 5/1998
(Continued)

OTHER PUBLICATIONS

Office Action dated Oct. 2, 2018 in corresponding Japanese Patent Application No. 2015-068712 with an English machine Translation.
(Continued)

*Primary Examiner* — John Kwon
(74) *Attorney, Agent, or Firm* — Birch, Stewart, Kolasch & Birch, LLP

(57) ABSTRACT

An engine control device is provided which includes a first fuel injection valve; a second injection valve provided at such a position that the amount of fuel injected by the second fuel injection valve and adhering to the inner peripheral wall of a cylinder is smaller; a cooling water temperature detector for detecting the temperature of cooling water for cooling an engine; and an injection ratio determining arrangement for determining the ratio between the amount of fuel injected by the first fuel injection valve and the amount of fuel injected by the second fuel injection valve based on the temperature of cooling water. The injection ratio determining arrangement stores an injection amount adjustment operation range in which the injection ratio determining arrangement is configured to increase the fuel injection ratio of the amount
(Continued)

of fuel injected by the second fuel injection valve, when the temperature of cooling water falls.

18 Claims, 6 Drawing Sheets

(51) Int. Cl.
    *F02D 41/04*     (2006.01)
    *F02D 41/22*     (2006.01)
    *F02D 45/00*     (2006.01)
    *F02D 41/30*     (2006.01)
    *F02D 41/02*     (2006.01)
    *F02D 41/34*     (2006.01)
    *F02M 69/04*     (2006.01)

(52) U.S. Cl.
    CPC ..... *F02D 41/3029* (2013.01); *F02D 41/3094* (2013.01); *F02D 41/401* (2013.01); *F02D 45/00* (2013.01); *F02D 41/02* (2013.01); *F02D 41/34* (2013.01); *F02D 2200/021* (2013.01); *F02D 2200/0616* (2013.01); *F02M 69/046* (2013.01); *Y02T 10/44* (2013.01)

(58) Field of Classification Search
    USPC ................................ 123/429, 431, 432, 434
    See application file for complete search history.

(56) References Cited

U.S. PATENT DOCUMENTS

| | | | |
|---|---|---|---|
| 2006/0096572 A1 | 5/2006 | Satou et al. | |
| 2006/0207551 A1 | 9/2006 | Ikoma | |
| 2006/0225703 A1 | 10/2006 | Saito et al. | |
| 2007/0017484 A1 | 1/2007 | Kinose | |
| 2011/0162620 A1 | 7/2011 | Bidner et al. | |
| 2011/0246049 A1 | 10/2011 | Matsuo et al. | |
| 2011/0270611 A1* | 11/2011 | Nishimura | F16N 29/00 704/246 |
| 2014/0172275 A1 | 6/2014 | Surnilla et al. | |
| 2017/0058807 A1* | 3/2017 | Yanagawa | F02D 41/047 |
| 2018/0017011 A1* | 1/2018 | Kumagae | F02D 35/025 |
| 2018/0023504 A1* | 1/2018 | Nakamura | F02D 41/04 123/445 |

FOREIGN PATENT DOCUMENTS

| | | |
|---|---|---|
| JP | 2005-146921 A | 6/2005 |
| JP | 2007-32315 A | 2/2007 |
| JP | 2007-32326 A | 2/2007 |
| JP | 2007-198275 A | 8/2007 |
| JP | 2008-255833 A | 10/2008 |
| JP | 2009-13818 A | 1/2009 |
| JP | 2011-132920 A | 7/2011 |
| JP | 2011-214447 A | 10/2011 |
| JP | 2011-226473 A | 11/2011 |
| JP | 2012-229656 A | 11/2012 |
| WO | WO 2006/051925 A1 | 5/2006 |

OTHER PUBLICATIONS

Extended European Search Report dated Mar. 1, 2018 in corresponding European Patent Application No. 16771902.0.
Japanese Office Action, dated Mar. 26, 2019, for Japanese Application No. 2015-068712, with an English translation.

\* cited by examiner

ENGINE CONTROL DEVICE

TECHNICAL FIELD

The present invention relates to an engine control device for preventing the occurrence of pre-ignition.

BACKGROUND ART

Engines are known which include a direct injection valve configured to directly inject fuel into a cylinder, and a port injection valve configured to inject fuel into an intake port.

Such engines include a control device configured to cause fuel to be injected from only one of the direct injection valve and the port injection valve, or from both of these valves in accordance with the operation state of the engine.

Especially in engines including the direct injection valve, pre-ignition tends to occur which is a phenomenon in which fuel is spontaneously ignited in a cylinder before ignited by an ignition device such as an ignition plug. If pre-ignition occurs, pressure rapidly increases in the combustion chamber, so that the shock wave collides with the piston or the inner periphery of the cylinder. This collision further increases the temperature in the cylinder, so that the engines may become unable to function properly.

Especially in recent high compression ratio engines, the higher the compression ratio is, the more likely low-speed pre-ignition is to occur in the low-revolution, high-load operation range of the engines. In case of engines including a supercharger, the higher the supercharging pressure is, the more likely low-speed pre-ignition is to occur in the low-revolution, high-load operation range of the engines. Therefore, it is necessary to take a countermeasure to prevent this phenomenon.

As one of the causes of pre-ignition occurrence, it is said that deposits accumulated in the combustion chamber or liquid drops of lubricant oil dispersed from the inner peripheral wall of the cylinder ignite as the temperature of the combustion chamber rises so that end gas is self-ignited.

As a method for preventing pre-ignition, for example, there is a method for lowering the temperature of air-fuel mixture, or a method for lowering the oxygen concentration in air-fuel mixture. As a method for lowering the temperature of air-fuel mixture, for example, there is a method for lowering the supercharging pressure of air-fuel mixture by waste gate valve control, etc., or a method for lowering the actual compression ratio by retarding an intake valve by variable valve timing mechanism.

The below-identified Patent Documents 1 and 2 disclose that as a measure after the occurrence of pre-ignition in the high-revolution, high-load operation range of the engine, the enrichment of air-fuel ratio, the retardation of the closing timing of the intake valve, or the retardation of the injection timing of a portion of the fuel, etc. is performed in a stepwise manner.

PRIOR ART DOCUMENTS

Patent Documents

Patent document 1: Japanese Unexamined Patent Application Publication No. 2011-226473

Patent document 2: Japanese Unexamined Patent Application Publication No. 2011-214447

SUMMARY OF THE INVENTION

Problems to be Solved by the Invention

The method for lowering the temperature of air-fuel mixture or the method for lowering the oxygen concentration in air-fuel mixture may markedly deteriorate engine output depending on operation conditions.

Patent documents 1 and 2 also disclose a measure after the occurrence of pre-ignition in the high-revolution, high-load operation range. However, neither of Patent documents 1 and 2 discloses a measure to prevent pre-ignition beforehand, especially a measure to prevent low-speed pre-ignition in the low-revolution, high-load operation range.

It is an object of the present invention to effectively prevent the occurrence of pre-ignition without markedly deteriorating engine output.

Means for Solving the Problems

In order to achieve the above object, the present invention provides an engine control device for controlling an engine including a cylinder, the engine control device comprising: a first fuel injection valve; a second fuel injection valve provided at such a position that an amount of fuel injected by the second fuel injection valve and adhering to an inner peripheral wall of the cylinder is smaller than an amount of fuel injected by the first fuel injection valve and adhering to the inner peripheral wall of the cylinder; a cooling water temperature detecting means for detecting a temperature of cooling water for cooling the engine; and an injection ratio determining means for determining a ratio between an amount of fuel injected by the first fuel injection valve and an amount of fuel injected by the second fuel injection valve based on the temperature of cooling water detected by the cooling water temperature detecting means, wherein the injection ratio determining means stores an injection amount adjustment operation range in which the injection ratio determining means is configured to increase a fuel injection ratio of the amount of fuel injected by the second fuel injection valve to a total amount of fuel injected by the first fuel injection valve and the second fuel injection valve, when the temperature of cooling water falls.

The injection ratio determining means may be configured, in the injection amount adjustment operation range, to increase the fuel injection ratio as an engine load applied to the engine increases.

The injection amount adjustment operation range may be a low-revolution, high-load operation range of the engine.

The engine control device may be configured such that in the injection amount adjustment operation range, a threshold value of the engine load at which the fuel injection ratio is increased is reduced as the temperature of cooling water falls.

The engine control device may be configured such that the first fuel injection valve comprises a direct injection valve configured to directly inject fuel into a combustion chamber, and such that the second fuel injection valve comprises a port injection valve configured to inject fuel into an intake passage leading to the combustion chamber.

Alternatively, the engine control device may be configured such that the first fuel injection valve comprises a lateral side direct injection valve mounted to one of an inner peripheral wall of a combustion chamber and a peripheral edge portion of a top of the combustion chamber on a side of a cylinder head, and configured to directly inject fuel into the combustion chamber, and such that the second fuel injection valve comprises an overhead direct injection valve mounted to a center of the top of the combustion chamber on the side of the cylinder head, and configured to directly inject fuel into the combustion chamber.

The engine control device may further comprise an injection timing determining means for determining timings of fuel injection by the first fuel injection valve and the second fuel injection valve; wherein the injection timing determining means stores an injection timing adjustment operation range in which the injection timing determining means is configured to advance the timing of fuel injection by the first fuel injection valve as the temperature of cooling water falls, when injecting fuel during an intake stroke.

The engine control device may be configured such that the injection timing adjustment operation range is a low-revolution, high-load operation range of the engine, and such that in the injection timing adjustment operation range, a threshold value of the engine load at which the timing of fuel injection by the first fuel injection valve is advanced is reduced as the temperature of cooling water falls.

Alternatively, the engine control device may further comprise an injection timing determining means for determining timings of fuel injection by the first fuel injection valve and the second fuel injection valve; wherein the injection timing determining means stores an injection timing adjustment operation range in which the injection timing determining means is configured to retard the timing of fuel injection by the first fuel injection valve as the temperature of cooling water falls, when injecting fuel during a compression stroke.

The engine control device may be configured such that the injection timing adjustment operation range is a low-revolution, high-load operation range of the engine, and such that in the injection timing adjustment operation range, a threshold value of the engine load at which the timing of fuel injection by the first fuel injection valve is retarded is reduced as the temperature of cooling water falls.

Effects of the Invention

The present invention provides the first fuel injection valve and the second fuel injection valve, which is provided at such a position that the amount of fuel injected by the second fuel injection valve and adhering to the inner peripheral wall of the cylinder is smaller than that of fuel injected by the first fuel injection valve and adhering to the inner peripheral wall of the cylinder. Also, the injection amount adjustment operation range is set such that a fuel injection ratio of the amount of fuel injected by the second fuel injection valve to the total amount of fuel injected by the first fuel injection valve and the second fuel injection valve is increased in the injection amount adjustment operation range, when the temperature of cooling water falls. Therefore, it is possible to effectively prevent the occurrence of pre-ignition without markedly deteriorating engine output.

BEST MODE FOR CARRYING OUT THE INVENTION

Figure 1:
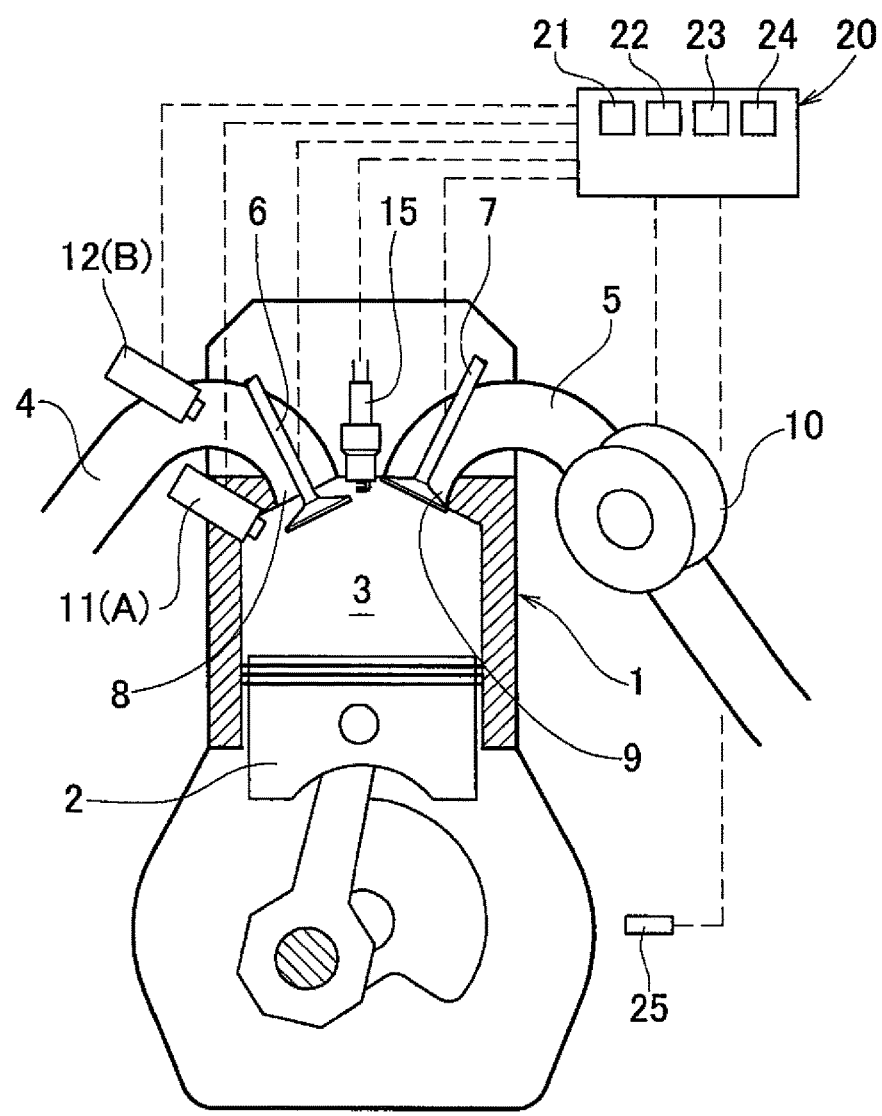
FIG. 1 is a vertical sectional view of an engine according to an embodiment of the present invention.

The embodiments of the present invention are now described with reference to the drawings. FIG. 1 is a vertical sectional view illustrating a cylinder of an engine according to one embodiment of the present invention.

The engine of this embodiment is a four-stroke gasoline engine for an automobile. As shown in FIG. 1, a piston 2 is received in the cylinder of the engine 1. A combustion chamber 3 is defined by the inner peripheral wall of the cylinder, the top of the cylinder on the side of a cylinder head, the top surface of the piston 2, etc.

The engine 1 further includes an intake passage 4 through which an air is sucked into the combustion chamber 3 of the cylinder, in which the piston 2 is received, an exhaust passage 5 connected to the combustion chamber 3, and an ignition plug provided as an ignition means 15 directed downwardly from the side of the cylinder head along the center axis of the cylinder.

The drawings mainly illustrate components and means directly relating to the present invention, and do not illustrate other components, means, etc. While the drawings illustrate only one cylinder, the engine 1 may be a single-cylinder engine or a multi-cylinder engine, i.e., an engine having a plurality of cylinders.

An intake valve hole 8 through which the intake passage 4 opens to or communicates with the combustion chamber 3 is opened and closed by an intake valve 6. An exhaust valve hole 9 through which the exhaust passage 5 opens to or communicates with the combustion chamber 3 is opened and closed by an exhaust valve 7. The intake valve 6 and the exhaust valve 7 are connected through respective valve lifters to a camshaft provided on the side of the cylinder head such that when the camshaft rotates, the intake valve hole 8 and the exhaust valve hole 9 are opened and closed at predetermined time intervals by the intake valve 6 and the exhaust valve 7, respectively.

The numbers of intake and exhaust valves 6 and 7 are appropriately determined in accordance with the intended use and the specifications of the engine 1. For example, the engine 1 may include, per cylinder, two intake valves 6 and two exhaust valves 7, or one intake valve 6 and one exhaust valve 7.

The intake and exhaust valves 6 and 7, the ignition means 15, and other devices necessary to activate the engine are controlled through cables by a control means provided in an electronic control unit (ECU) 20.

The engine includes a plurality of fuel injectors. In the embodiment, the engine 1 includes two fuel injectors comprising a first fuel injection valve A, and a second fuel injection valve B provided at such a position that the amount of fuel injected by the second fuel injection valve B and adhering to the inner peripheral wall of the cylinder is smaller than the amount of fuel injected by the first fuel injection valve A and adhering to the inner peripheral wall of the cylinder.

In the embodiment of FIG. 1, the first fuel injection valve A is a direct injection valve 11 configured to directly inject fuel into the combustion chamber 3, and the second fuel injection valve B is a port injection valve 12 configured to inject fuel into the intake passage 4, which leads to or communicates with the combustion chamber 3.

Fuel is fed from a fuel tank to the first and second fuel injection valves A and B by pumps mounted to the fuel tank. The pump that feeds fuel to the first fuel injection valve A (direct injection valve 11) is a high-pressure pump that generates a higher fuel injection pressure. By opening and closing electromagnetic valves mounted to the respective fuel injection valves, the timing of fuel injection from the fuel injection valves and the amount of fuel injected from the fuel injection valves are adjusted.

The engine 1 further includes a cooling water temperature detecting means 25 for detecting the temperature of cooling water in the cooling water channel for cooling the engine 1. The cooling water temperature detecting means 25 is provided in the cooling water channel, specifically, in the radiator or in the cooling water pipe. The electronic control unit 20 can obtain information on the water temperature detected by the cooling water temperature detecting means 25.

As illustrated in FIG. 1, the electronic control unit 20 includes an injection ratio determining means 21 for determining the ratio between the amount of fuel injected from the first fuel injection valve A and the amount of fuel injected from the second fuel injection valve B; an injection timing determining means 22 for determining fuel injection timing by each of the first and second fuel injection valves A and B; a total injection amount determining means 23 for determining the total injection amount of fuel injected per combustion cycle (for each cylinder, if the engine has more than one cylinder); and an operation state judging means 24 for judging the operation state of the engine 1 or the vehicle on which the engine 1 is mounted.

The operation state judging means 24 obtains information on the temperature of cooling water for the engine 1, the number of revolutions of the engine 1, the load applied to the engine 1 (hereinafter simply referred to as "the engine load"), etc., and utilizes such information to control the engine 1. The operation state judging means 24 obtains the information on the number of revolutions of the engine 1 based on the information from e.g., a crank angle sensor, and obtains the information on the engine load based on the information on the degree of opening of the throttle valve, which operates in synchronization with the accelerator pedal, the amount of injected fuel, the number of revolutions of the engine, vehicle speed, etc.

Based on the temperature of cooling water detected by the cooling water temperature detecting means 25, the injection ratio determining means 21 determines the ratio between the amount of fuel injected by the first fuel injection valve A and the amount of fuel injected by the second fuel injection valve B.

The injection ratio determining means 21 stores an injection amount adjustment operation range R in which as the temperature of cooling water falls, the injection ratio determining means 21 increases the ratio of the amount of fuel injected by the second fuel injection valve B, to the total amount of injected fuel. In this embodiment, in order to prevent low-speed pre-ignition, the injection amount adjustment operation range R is set at a low-revolution, high-load operation range of the engine (hereinafter referred to as the "low-speed, high-load range"). However, the injection amount adjustment operation range R should be set at an optimum operation range of the engine 1 taking into consideration the intended use and the specifications of the engine 1.

Based on the operation state obtained by the operation state judging means 24, the injection timing determining means 22 determines the times when fuel is to be injected from the respective fuel injection valves, i.e., the first and second fuel injection valves A and B.

Based on the operation state obtained by the operation state judging means 24, the total injection amount determining means 23 determines the total injection amount of fuel that has to be injected per combustion cycle (for each cylinder, if the engine has more than one cylinder) by all the fuel injection valves, i.e., the first and second fuel injection valves A and B.

The normal control relating to fuel injection is performed by the control means of the electronic control unit 20 based on the operation state. If the operation state is such that pre-ignition may occur in the engine 1, the injection ratio determining means 21 and the injection timing determining means 22 adjust the fuel injection ratio and the fuel injection timing, respectively.

Such controls are now described with reference to FIGS. 2A to 3F.

The controls of FIGS. 2A to 2F, which are performed by the injection ratio determining means 21, include the injection amount adjustment operation range R, in which, as described above, as the temperature of cooling water falls, the injection ratio determining means 21 increases the ratio of the amount of fuel injected by the second fuel injection valve B (port injection valve 12), to the total injection amount of fuel injected by both of the first and second fuel injection valves A and B. The injection amount adjustment operation range R shown is a low-speed, high-load operation range, in which low-speed pre-ignition may occur in the engine 1, specifically, a predetermined low-speed operation range in which the engine load is higher than value "a" in the graphs.

Since the second fuel injection valve B is provided at such a position that the amount of fuel injected by the second fuel injection valve B and adhering to the inner peripheral wall of the cylinder is smaller than the amount of fuel injected by the first fuel injection valve A and adhering to the inner peripheral wall of the cylinder, especially if the operation state is such that pre-ignition may occur, it is possible to reduce the amount of fuel adhering to the inner peripheral wall of the cylinder by increasing the ratio of the amount of fuel injected by the second fuel injection valve B, thereby preventing pre-ignition.

At this time, in view of the fact that the lower the temperature of cooling water is, the more likely pre-ignition is to occur, in the injection amount adjustment operation range R, as the temperature of cooling water falls, the injection ratio determining means 21 increases the ratio of the amount of fuel injected by the second fuel injection valve B in a stepwise manner. Since the second fuel injection valve B is the port injection valve 12 in this embodiment, the ratio of the amount of fuel injected by the second fuel injection valve B of this embodiment is hereinafter referred to as the "port injection ratio".

Figure 2A:
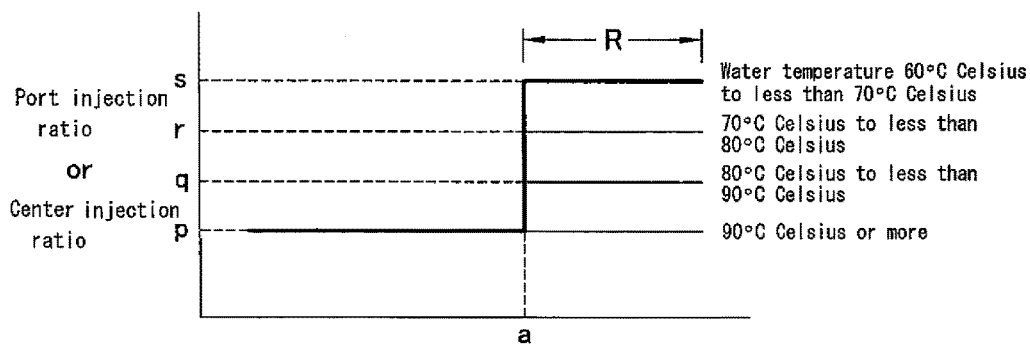
FIG. 2A is a graph illustrating a control of the engine according to the present invention.

The control of FIG. 2A is performed such that:

(i) even if the engine load is higher than value "a" in the graph, if the temperature of cooling water is 90 degrees Celsius or more, the port injection ratio, i.e., the ratio of the amount of fuel injected by the second fuel injection valve B of the embodiment of FIG. 1, is maintained at injection ratio "p" in the normal operation state;

(ii) if the water temperature is lower than 90 degrees Celsius but not lower than 80 degrees Celsius, and the engine load is higher than value "a", the port injection ratio is moved to injection ratio "q" which is higher than injection ratio "p";

(iii) if the water temperature is lower than 80 degrees Celsius but not lower than 70 degrees Celsius, and the engine load is higher than value "a", the port injection ratio is moved to injection ratio "r" which is higher than injection ratio "q"; and (iv) if the water temperature is lower than 70 degrees Celsius but not lower than 60 degrees Celsius, and the engine load is higher than value "a", the port injection ratio is moved to the highest injection ratio "s". In the control example of FIG. 2A, as well as in the control examples of FIGS. 2B-2F, if the water temperature falls below 60 degrees Celsius, the port injection ratio may be maintained at injection ratio "s", or may be moved to an injection ratio higher than injection ratio "s".

Figure 2B:
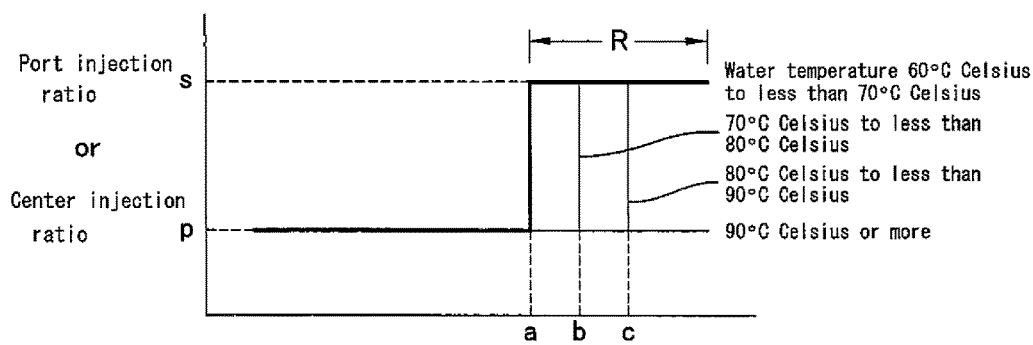
FIG. 2B is a graph illustrating a control of the engine according to the present invention.

The control of FIG. 2B is performed such that if the temperature of cooling water is 90 degrees Celsius or more, regardless of the value of the engine load, the port injection ratio, i.e. the ratio of the amount of fuel injected from the second fuel injection valve B of the embodiment of FIG. 1, is maintained at injection ratio "p" in the normal operation state. On the other hand, if the water temperature falls below 90 degrees Celsius, in accordance with the water temperature and the value of the engine load, the port injection ratio is moved to injection ratio "s" which is higher than injection ratio "p". Specifically, if the water temperature is lower than 90 degrees Celsius but not lower than 80 degrees Celsius or more, the port injection ratio is moved to injection ratio "s" when the engine load exceeds a relatively large value "c", and if the water temperature is lower than 80 degrees Celsius but not lower than 70 degrees Celsius, the port injection ratio is moved to injection ratio "s" when the engine load exceeds value "b" which is slightly smaller than value "c". If the water temperature falls below 70 degrees Celsius, the port injection ratio is moved to the injection ratio "s" when the engine load exceeds value "a" which is the smallest value in the range R. Namely, in this control example, the threshold value of the engine load at which the port injection ratio is increased is reduced as the water temperature falls.

In other words, in this control example:

(i) while the engine load is "a" or less, regardless of the temperature of cooling water, the port injection ratio is maintained at injection ratio "p" (initial value);

(ii) if the engine load is higher than "a" but not higher than "b", the port injection ratio is raised to the higher injection ratio "s" only when the water temperature falls below 70 degrees Celsius;

(iii) if the engine load is higher than "b" but not higher than "c", the port injection ratio is raised to the higher injection ratio "s" only when the water temperature falls below 80 degrees Celsius; and (iv) if the engine load is higher than "c", the port injection ratio is raised to the higher injection ratio "s" only when the water temperature falls below 90 degrees Celsius.

Figure 2C:
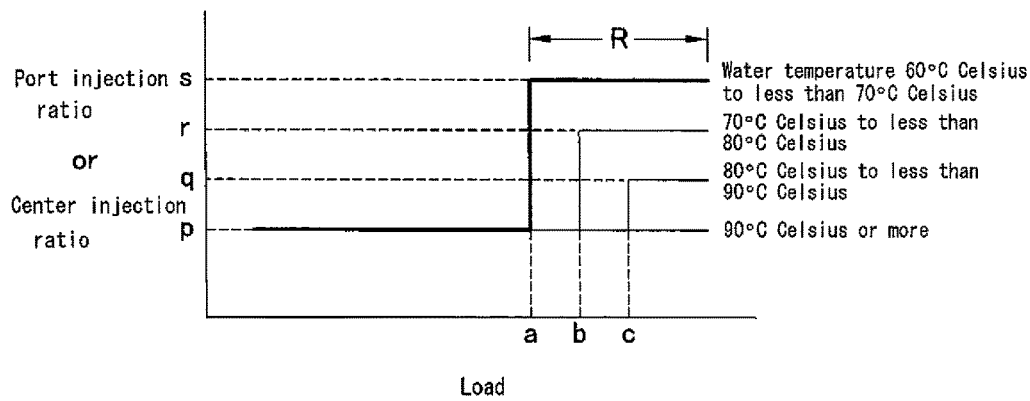
FIG. 2C is a graph illustrating a control of the engine according to the present invention.

The control of FIG. 2C is performed such that if the temperature of cooling water is 90 degrees Celsius or more, regardless of the value of the engine load, the port injection ratio, i.e., the ratio of the amount of fuel injected by the second fuel injection valve B of the embodiment of FIG. 1, is maintained at injection ratio "p" in the normal operation state. On the other hand, if the water temperature falls below 90 degrees Celsius, in accordance with the water temperature and the value of the engine load, the port injection ratio is moved to injection ratios "q", "r" or "s" which are higher than "p", "q" and "r", respectively. Specifically:

(i) if the water temperature is lower than 90 degrees Celsius but not lower than 80 degrees Celsius, the port injection ratio is moved to injection ratio "q", which is slightly higher than injection ratio "p" (initial value), when the engine load exceeds a relatively large value "c";

(ii) if the water temperature is lower than 80 degrees Celsius but not lower than 70 degrees Celsius, the port injection ratio is moved to injection ratio "r", which is higher than injection ratio "q", when the engine load exceeds value "b" which is slightly smaller than value "c"; and (iii) if the water temperature is lower than 70 degrees Celsius, the port injection ratio is moved to the highest injection ratio "s" when the engine load exceeds value "a" which is the smallest value in the range R. Namely, the threshold value of the engine load at which the port injection ratio, i.e., the ratio of the amount of fuel injected by the second fuel injection valve B, is increased is reduced as the water temperature falls.

In other words, in this control example:

(i) while the engine load is "a" or less, regardless of the temperature of cooling water, the port injection ratio is maintained at injection ratio "p" (initial value);

(ii) if the engine load is higher than "a" but not higher than "b", the port injection ratio is raised to the highest injection ratio "s" only when the water temperature falls below 70 degrees Celsius;

(iii) if the engine load is higher than "b" but not higher than "c", the port injection ratio is moved to injection ratio "s" when the water temperature falls below 70 degrees Celsius, and is moved to injection ratio "r" when the water temperature is lower than 80 degrees Celsius but not lower than 70 degrees Celsius; and (iv) if the engine load exceeds value "c", the port injection ratio is moved to injection ratio "s" when the water temperature falls below 70 degrees Celsius, moved to injection ratio "r" when the water temperature is lower than 80 degrees Celsius but not lower than 70 degrees Celsius, and moved to injection ratio "q" when the water temperature is lower than 90 degrees Celsius but not lower than 80 degrees Celsius.

Figure 2D:
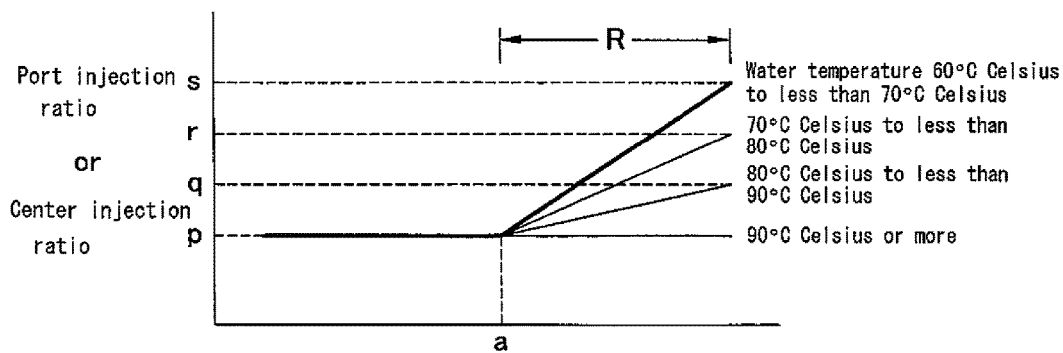
FIG. 2D is a graph illustrating a control of the engine according to the present invention.

The control of FIG. 2D is performed such that even if the engine load exceeds value "a" in the graph, if the temperature of cooling water is 90 degrees Celsius or more, the port injection ratio, i.e., the ratio of the amount of fuel injected by the second fuel injection valve, is maintained at injection ratio "p" in the normal operation state. On the other hand, if the water temperature falls below 90 degrees Celsius, in accordance with the water temperature and the value of the engine load, the port injection ratio is gradually moved to a higher injection ratio. Specifically, as the engine load increases, the port injection ratio is gradually increased such that:

(i) if the water temperature is lower than 90 degrees Celsius but not lower than 80 degrees Celsius, the port injection ratio is moved to injection ratio "q" which is slightly higher than injection ratio "p" (initial value) when the engine load reaches its upper limit in the range R;

(ii) if the water temperature is lower than 80 degrees Celsius but not lower than 70 degrees Celsius, the port injection ratio is moved to injection ratio "r" which is higher than injection ratio "q" when the engine load reaches its upper limit; and (iii) if the water temperature is lower than 70 degrees Celsius, the port injection ratio is moved to the highest injection ratio "s" when the engine load reaches its upper limit. In the control example of FIG. 2D, as well as the control examples of FIGS. 2E and 2F, while the injection ratio is controlled such that the relationship between the injection ratio and the engine load in the injection amount adjustment operation range R is represented by straight lines, i.e., linear functions where the engine load is on the horizontal axis of the graph, and the injection ratio is on the vertical axis of the graph, the injection ratio may be controlled such that this relationship is represented by curve lines such as quadratic curves.

Figure 2E:
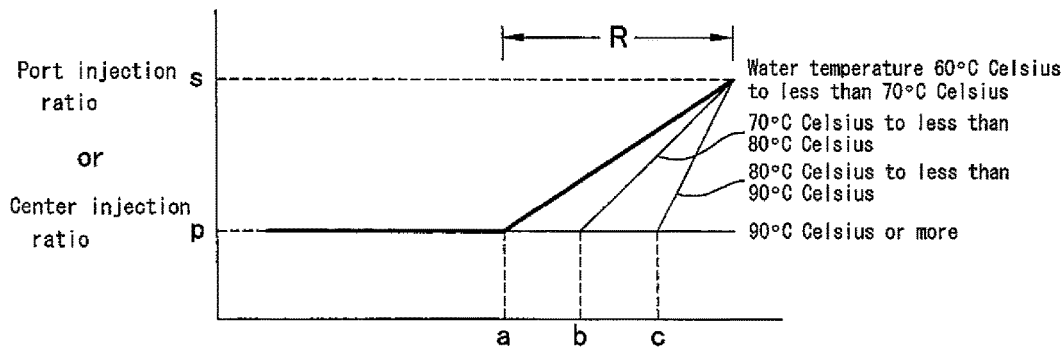
FIG. 2E is a graph illustrating a control of the engine according to the present invention.

The control of FIG. 2E is performed such that if the temperature of cooling water is 90 degrees Celsius or more, regardless of the value of the engine load, the port injection ratio, i.e., the ratio of the amount of fuel injected by the second fuel injection valve B of the embodiment of FIG. 1, is maintained at injection ratio "p" (initial value) in the normal operation state. On the other hand, if the water temperature falls below 90 degrees Celsius, in accordance with the water temperature and the value of the engine load, the port injection ratio is moved to a higher injection ratio. Specifically, the port injection ratio is controlled such that:

(i) if the water temperature is lower than 90 degrees Celsius but not lower than 80 degrees Celsius, the port injection ratio begins to gradually increase as the engine load increases after the engine load exceeds a relatively large value "c";

(ii) if the water temperature is lower than 80 degrees Celsius but not lower than 70 degrees Celsius, the port injection ratio begins to gradually increase as the engine load increases after the engine load exceeds value "b" which is slightly smaller than value "c"; and (iii) if the water temperature is lower than 70 degrees Celsius, the port injection ratio begins to gradually increase as the engine load increases after the engine load exceeds value "a" which is the smallest value in the range R. Namely, in this control example, the threshold value of the engine load above which the port injection ratio begins to gradually increase is reduced as the water temperature falls. In the control of FIG. 2E, regardless of the temperature of cooling water (if it is not lower than 60 degrees Celsius and lower than 90 degrees Celsius), the port injection ratio is moved to injection ratio "s" when the engine load reaches its upper limit in the range R.

In other words, in this control example:

(i) while the engine load is "a" or less, regardless of the temperature of cooling water, the port injection ratio is maintained at injection ratio "p" (initial value);

(ii) while the engine load is higher than "a" but not higher than "b", the port injection ratio is gradually increased as the engine load increases only when the water temperature is lower than 70 degrees Celsius;

(iii) while the engine load is higher than "b" but not higher than "c", the port injection ratio is gradually increased as the engine load increases only when the water temperature is lower than 80 degrees Celsius; and (iv) while the engine load is higher than "c", the port injection ratio is gradually increased as the engine load increases only when the water temperature is lower than 90 degrees Celsius.

Figure 2F:
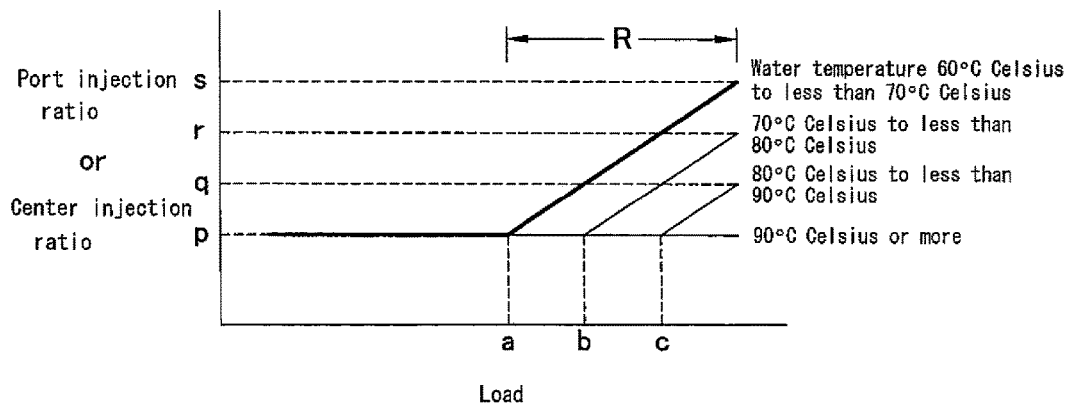
FIG. 2F is a graph illustrating a control of the engine according to the present invention.

The control of FIG. 2F is performed such that if the temperature of cooling water is 90 degrees Celsius or more, regardless of the value of the engine load, the port injection ratio, i.e., the ratio of the amount of fuel injected by the second fuel injection valve B of the embodiment of FIG. 1, is maintained at injection ratio "p" (initial value) in the normal operation state. On the other hand, if the water temperature falls below 90 degrees Celsius, in accordance with the water temperature and the value of the engine load, the port injection ratio is moved to a higher injection ratio. Specifically, the port injection ratio is controlled such that:

(i) if the water temperature is lower than 90 degrees Celsius but not lower than 80 degrees Celsius, the port injection ratio begins to gradually increase as the engine load increases after the engine load exceeds a relatively large value "c";

(ii) if the water temperature is lower than 80 degrees Celsius but not lower than 70 degrees Celsius, the port injection ratio begins to gradually increase as the engine load increases after the engine load exceeds value "b" which is slightly smaller than value "c";

(iii) if the water temperature is lower than 70 degrees Celsius, the port injection ratio begins to gradually increase as the engine load increases after the engine load exceeds value "a" which is the smallest value in the range R. Namely, in this control example, the threshold value of the engine load above which the port injection ratio, i.e., the ratio of the amount of fuel injected by the second fuel injection valve B, begins to increase, is reduced as the water temperature falls.

Also, the port injection ratio is gradually increased as the engine load increases such that:

(i) if the temperature of cooling water is lower than 90 degrees Celsius but not lower than 80 degrees Celsius, the port injection ratio moves to injection ratio "q" which is slightly higher than injection ratio "p" (initial value) when the engine load reaches its upper limit in the range R;

(ii) if the water temperature is lower than 80 degrees Celsius but not lower than 70 degrees Celsius, the port injection ratio moves to injection ratio "r" which is higher than injection ratio "q" when the engine load reaches its upper limit; and (iii) if the water temperature is lower than 70 degrees Celsius, the port injection ratio moves to the highest injection ratio "s" when the engine load reaches its upper limit.

Figure 4:
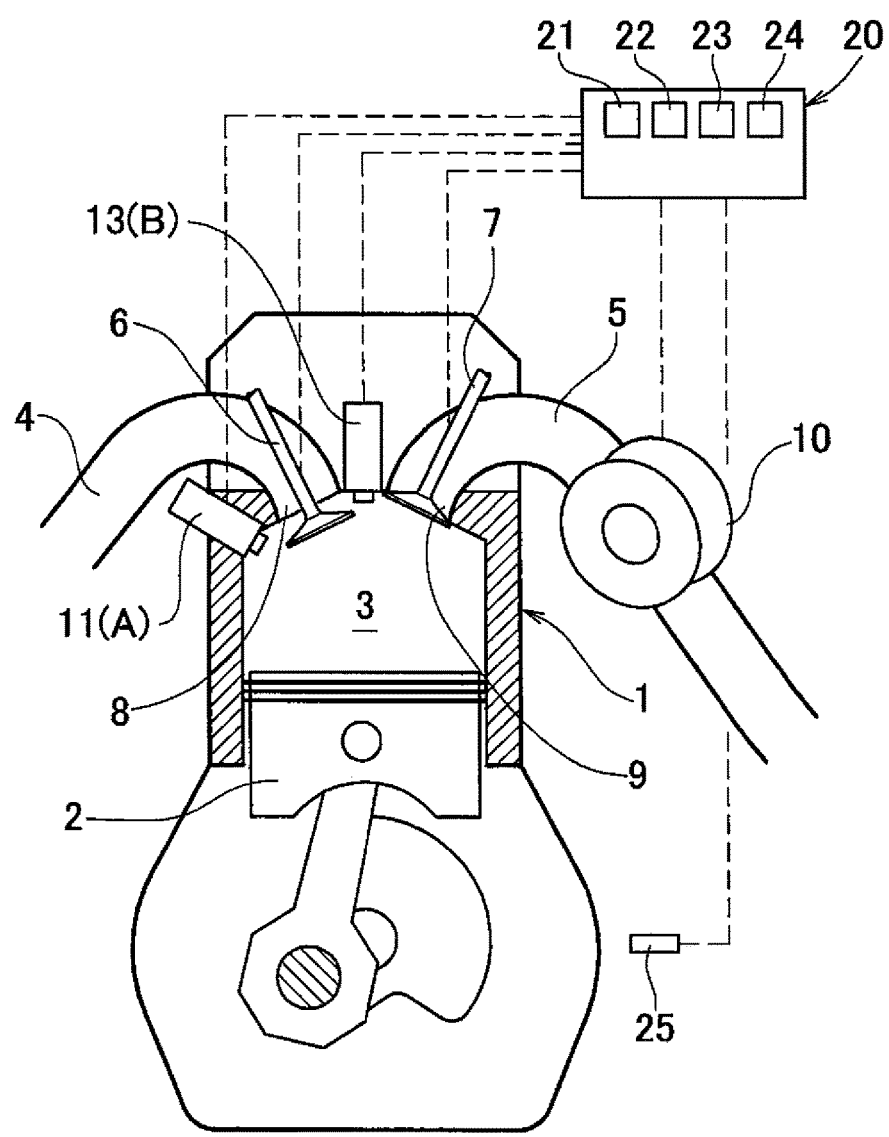
FIG. 4 is a vertical sectional view of an engine according to another embodiment of the present invention.

In the above embodiment, as described above, the first fuel injection valve A, as one of the fuel injectors, is a direct injection valve 11, i.e., a valve configured to directly inject fuel into the combustion chamber 3 of the cylinder, mounted to the inner peripheral wall of the combustion chamber 3 or to the peripheral edge portion of the top of the combustion chamber 3 on the side of the cylinder head (this valve is hereinafter referred to as the "lateral side direct injection valve"); while the second fuel injection valve B, as the other of the fuel injectors, is a port injection valve 12 configured to inject fuel into the intake passage 4. FIG. 4 shows an embodiment in which the second fuel injection valve B is an overhead direct injection valve 13 mounted to the center of the top of the combustion chamber 3 on the side of the cylinder head, and directed downwardly, i.e., toward the head of the piston 2. The ignition means 15 is not illustrated in FIG. 4.

That is, in FIG. 4, the first fuel injection valve A is a lateral side direct injection valve 11 mounted to the inner peripheral wall of the combustion chamber 3 or to the peripheral edge portion of the top of the combustion chamber 3 on the side of the cylinder head as in the embodiment of FIG. 1; while the second fuel injection valve B is an overhead direct injection valve 13 mounted to the center of the top of the combustion chamber 3 on the side of the cylinder head.

Since in the embodiment of FIG. 4, an overhead direct injection valve 13 is used as the second fuel injection valve B instead of the port injection valve of the embodiment of FIG. 1, the controls of FIGS. 2A to 2F are performed in the embodiment of FIG. 4 such that as the temperature of cooling water falls, the ratio of the amount of fuel injected by the overhead direct injection valve 13, to the total amount of fuel injected by all the fuel injection valves (injection valves 11 and 13) is increased. (This ratio is hereinafter referred to as the "center injection ratio".) That is, in the embodiment of FIG. 4, too, the controls of FIGS. 2A to 2F are performed in exactly the same manner as described above, except that since the port injection valve 12 is replaced with the overhead direct injection valve 13, instead of the port injection ratio, on the vertical axis of the graphs, the center injection ratio is controlled. Therefore, the description of FIGS. 2A-2F is not repeated.

While, in the controls of FIGS. 2A-2F, a plurality of temperature ranges each having a width of 10 degrees Celsius are predetermined, and as the temperature of cooling water falls from one of the temperature ranges to another temperature range while the engine is in the injection amount adjusting operation range R, the fuel injection ratio by the second fuel injection valve B is increased in a stepwise manner, the widths of the temperature ranges are not limited to 10 degrees Celsius, and may be, for example, 5 degrees Celsius or 4 degrees Celsius. Also, such temperature ranges may not be set so that the injection ratio is steplessly increased and decreased in accordance with the temperature of cooling water.

FIGS. 3A to 3F show how the timing of fuel injection by the second fuel injection valve B (port injection valve 12 or overhead direct injection valve 13) is controlled by the injection timing determining means 22. The controls of FIGS. 3A to 3F are performed in addition to the above controls of FIGS. 2A to 2F.

As illustrated in FIGS. 3A to 3F, the injection timing determining means 22 stores an injection timing adjustment operation range T in which when injecting fuel during the intake stroke of each combustion cycle of the piston 2, the timing of fuel injection by the first fuel injection valve A is advanced as the temperature of cooling water falls. This is because the earlier the stage of the intake stroke, the larger portion of the inner peripheral wall of the cylinder is hidden by the piston 2, so that by advancing the timing of fuel injection during the intake stroke as described above, it is possible to reduce the amount of fuel adhering to the inner peripheral wall of the cylinder, and thus to avoid pre-ignition.

Also, when injecting fuel during the compression stroke of each combustion cycle of the piston 2, the timing of fuel injection by the first fuel injection valve A is retarded as the temperature of cooling water falls. This is because the later the stage of the compression stroke, the larger portion of the inner peripheral wall of the cylinder is hidden by the piston 2, so that by retarding the timing of fuel injection during the compression stroke as described above, it is possible to reduce the amount of fuel adhering to the inner peripheral wall of the cylinder, and thus to avoid pre-ignition.

Figure 3A:
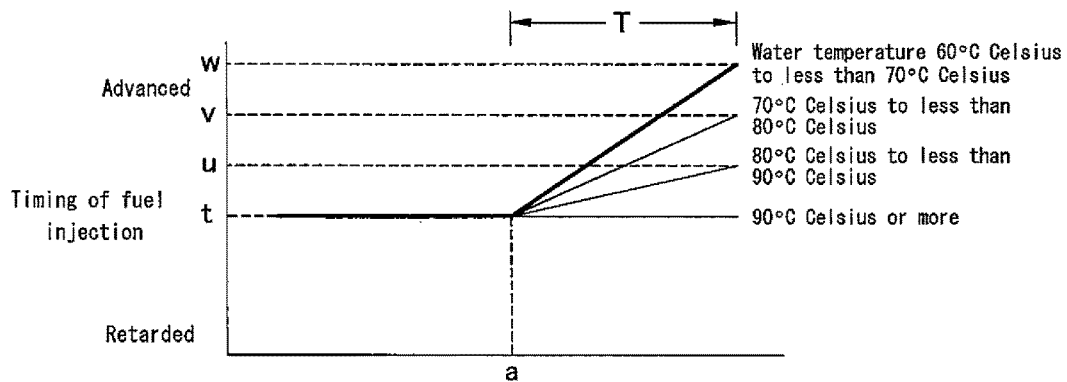
FIG. 3A is a graph illustrating a control of the engine according to the present invention.

The control of FIG. 3A is performed such that when injecting fuel during the intake stroke, even if the engine load exceeds value "a" in the graph, if the temperature of cooling water is 90 degrees Celsius or more, the timing of fuel injection by the first fuel injection valve A is maintained at injection timing "t" (initial value) in the normal operation state. On the other hand, if the water temperature is lower than 90 degrees Celsius, the timing of fuel injection by the first fuel injection valve A is advanced in accordance with the water temperature and the value of the engine load. Specifically, as the engine load increases, the timing of fuel injection is gradually advanced such that;

(i) if the water temperature is lower than 90 degrees Celsius but not lower than 80 degrees Celsius, the timing of fuel injection is advanced to injection timing "u" which is slightly earlier than injection timing "t" (initial value) when the engine load reaches its upper limit in the range T;

(ii) if the water temperature is lower than 80 degrees Celsius but not lower than 70 degrees Celsius, the timing of fuel injection is advanced to injection timing "v" which is earlier than injection timing "u" when the engine load reaches its upper limit; and (iii) if the water temperature is lower than 70 degrees Celsius, the timing of fuel injection is advanced to the earliest injection timing "w" when the engine load reaches its upper limit. In the control example of 3A, as well as in the control examples of FIGS. 3B-3F, while the timing of fuel injection is controlled such that the relationship between the timing of fuel injection and the engine load is represented by straight lines, i.e., linear functions where the engine load is on the horizontal axis of the graph, and the fuel injection timing is on the vertical axis of the graph (timing of fuel injection advances upwardly in the graph), the timing of fuel injection may be controlled such that this relationship is represented by curved lines such as quadratic curves.

Figure 3B:
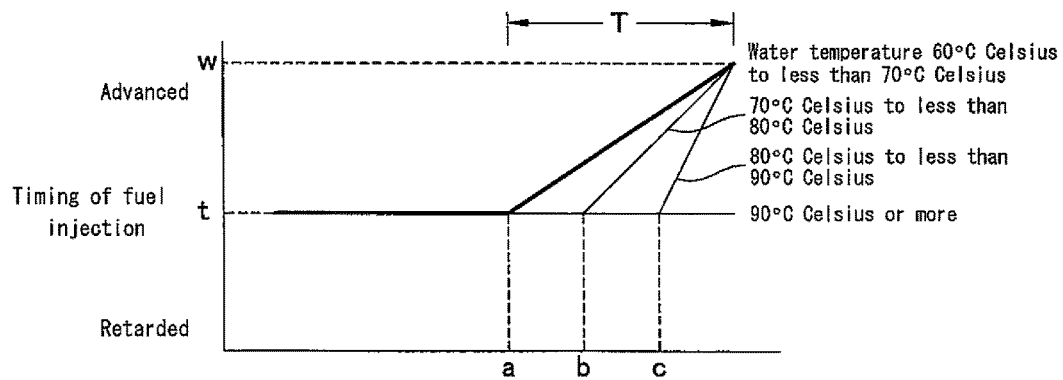
FIG. 3B is a graph illustrating a control of the engine according to the present invention.

The control of FIG. 3B is performed such that when injecting fuel during the intake stroke, if the temperature of cooling water is 90 degrees Celsius or more, regardless of the value of the engine load, the timing of fuel injection by the first fuel injection valve A is maintained at injection timing "t" (initial value) in the normal operation state. On the other hand, if the water temperature falls below 90 degrees Celsius, the timing of fuel injection is advanced in accordance with the water temperature and the value of the engine load. Specifically, the timing of fuel injection is controlled such that:

(i) if the water temperature is lower than 90 degrees Celsius but not lower than 80 degrees Celsius, the timing of fuel injection timing begins to gradually advance as the engine load increases after the engine load exceeds a relatively large value "c";

(ii) if the water temperature is lower than 80 degrees Celsius but not lower than 70 degrees Celsius, the timing of fuel injection begins to gradually advance as the engine load increases after the engine load exceeds value "b" which is slightly smaller than value "c"; and (iii) if the water temperature is lower than 70 degrees Celsius, the timing of fuel injection begins to gradually advance as the engine load increases after the engine load exceeds value "a" which is the smallest value in the range T. Namely, the lower limit value of the engine load above which the timing of fuel injection is gradually advanced is reduced as the water temperature falls. In the control of FIG. 3B, regardless of the temperature of cooling water (if it is not lower than 60 degrees Celsius and lower than 90 degrees Celsius), the timing of fuel injection is advanced to injection timing "w" when the engine load reaches its upper limit in the range T.

Figure 3C:
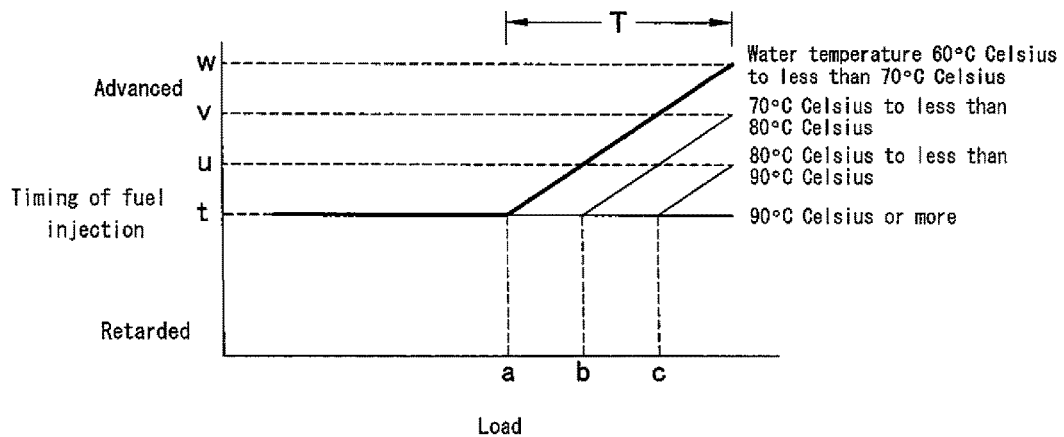
FIG. 3C is a graph illustrating a control of the engine according to the present invention.

The control of FIG. 3C is performed such that when injecting fuel during the intake stroke, if the temperature of cooling water is 90 degrees Celsius or more, regardless of the value of the engine load, the timing of fuel injection by the first fuel injection valve A is maintained at injection timing "t" (initial value) in the normal operation state. On the other hand, if the water temperature falls below 90 degrees Celsius, the timing of fuel injection is advanced in accordance with the water temperature and the value of the engine load. Specifically, the timing of fuel injection is controlled such that:

(i) if the water temperature is lower than 90 degrees Celsius but not lower than 80 degrees Celsius, the timing of fuel injection gradually advances as the engine load increases after the engine load exceeds a relatively large value "c";

(ii) if the water temperature is lower than 80 degrees Celsius but not lower than 70 degrees Celsius, the timing of fuel injection gradually advances as the engine load increases after the engine load exceeds value "b" which is slightly smaller than value "c"; and (iii) if the water temperature is lower than 70 degrees Celsius, the timing of fuel injection gradually advances as the engine load increases after the engine load exceeds value "a" which is the smallest value in the range T.

Also, the timing of fuel injection is gradually advanced as the engine load increases such that:

(i) if the temperature of cooling water is lower than 90 degrees Celsius but not lower than 80 degrees Celsius, the timing of fuel injection is advanced to injection timing "u" which is slightly earlier than injection timing "t" (initial value) when the engine load reaches its upper limit in the range T;

(ii) if the water temperature is lower than 80 degrees Celsius but not lower than 70 degrees Celsius, the timing of fuel injection is advanced to injection timing "v" which is earlier than injection timing "u" when the engine load reaches its upper limit; And (iii) if the water temperature is lower than 70 degrees Celsius, the timing of fuel injection is advanced to the earliest injection timing "w" when the engine load reaches its upper limit.

Figure 3D:
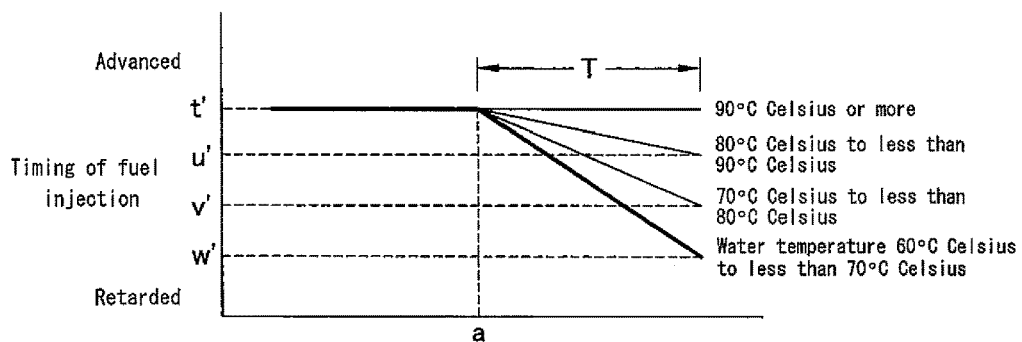
FIG. 3D is a graph illustrating a control of the engine according to the present invention.

The control of FIG. 3D is performed such that when injecting fuel during the compression stroke, even if the engine load exceeds value "a" in the graph, if the temperature of cooling water is 90 degrees Celsius or more, the timing of fuel injection by the first fuel injection valve A is maintained at injection timing t' (initial value) in the normal operation state. On the other hand, if the water temperature falls below 90 degrees Celsius, the timing of fuel injection is retarded in accordance with the water temperature and the value of the engine load. Specifically, as the engine load increases, the timing of fuel injection is gradually retarded such that:

(i) if the water temperature is lower than 90 degrees Celsius but not lower than 80 degrees Celsius, the timing of fuel injection is retarded to injection timing u' which is slightly later than injection timing t' (initial value) when the engine load reaches its upper limit in the range T;

(ii) if the water temperature is lower than 80 degrees Celsius but not lower than 70 degrees Celsius, the timing of fuel injection is retarded to injection timing v' which is later than injection timing u'; and (iii) if the water temperature is lower than 70 degrees Celsius, the timing of fuel injection is retarded to the latest injection timing w'.

Figure 3E:
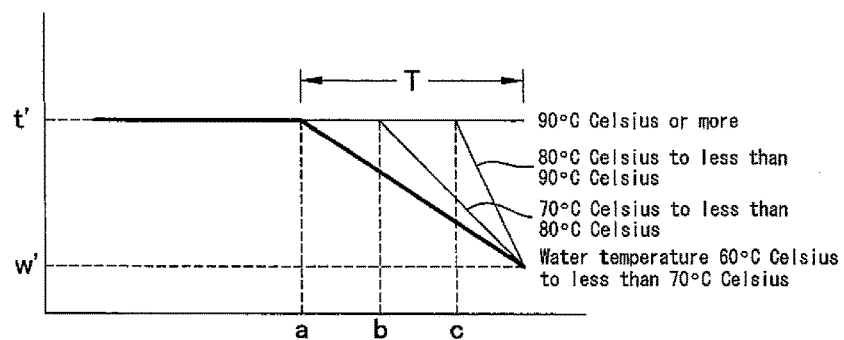
FIG. 3E is a graph illustrating a control of the engine according to the present invention.

The control of FIG. 3E is performed such that when injecting fuel during the compression stroke, if the temperature of cooling water is 90 degrees Celsius or more, regardless of the value of the engine load, the timing of fuel injection by the first fuel injection valve A is maintained at injection timing t' (initial value) in the normal operation state. On the other hand, if the water temperature falls below 90 degrees Celsius, the timing of fuel injection is retarded in accordance with the water temperature and the value of the engine load. Specifically, the timing of fuel injection is controlled such that:

(i) if the water temperature is lower than 90 degrees Celsius but not lower than 80 degrees Celsius, the timing of fuel injection timing begins to gradually retard as the engine load increases after the engine load exceeds a relatively large value "c";

(ii) if the water temperature is lower than 80 degrees Celsius but not lower than 70 degrees Celsius, the timing of fuel injection begins to gradually retard as the engine load increases after the engine load exceeds value "b" which is slightly smaller than value "c"; and (iii) if the water temperature is lower than 70 degrees Celsius, the timing of fuel injection begins to gradually retard as the engine load increases after the engine load exceeds value "a" which is the smallest value in the range T. Namely, the threshold value of the engine load above which the timing of fuel injection begins to retard is reduced as the water temperature falls. In the control of FIG. 3E, regardless of the temperature of cooling water (if it is not lower than 60 degrees Celsius and lower than 90 degrees Celsius), the timing of fuel injection is retarded to injection timing w' when the engine load reaches its upper limit in the range T.

Figure 3F:
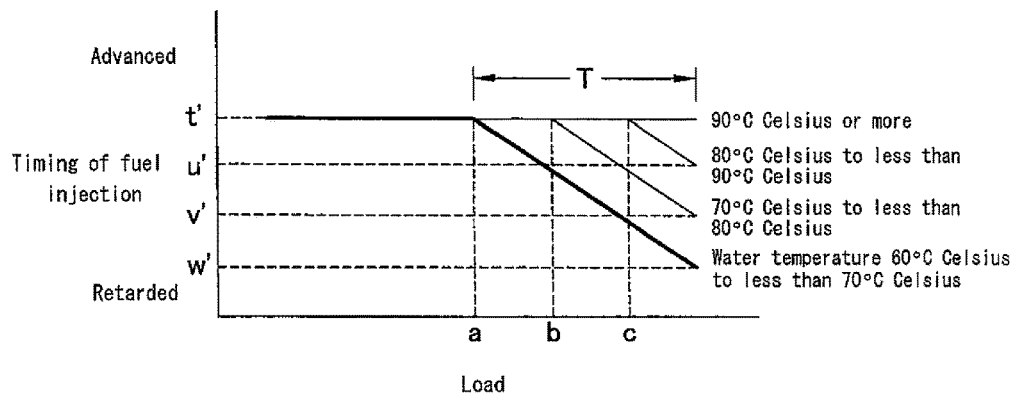
FIG. 3F is a graph illustrating a control of the engine according to the present invention.

The control of FIG. 3F is performed such that when injecting fuel during the compression step, if the temperature of cooling water is 90 degrees Celsius or more, regardless of the value of the engine load, the timing of fuel injection by the first fuel injection valve A is maintained at injection timing t' (initial value) in the normal operation state. On the other hand, if the water temperature falls below 90 degrees Celsius, the timing of fuel injection is retarded in accordance with the water temperature and the value of the engine load. Specifically, the timing of fuel injection is controlled such that:

(i) if the water temperature is lower than 90 degrees Celsius but not lower than 80 degrees Celsius, the timing of fuel injection begins to gradually retard as the engine load increases after the engine load exceeds a relatively large value "c";

(ii) if the water temperature is lower than 80 degrees Celsius but not lower than 70 degrees Celsius, the timing of fuel injection timing begins to gradually retard as the engine load increases after the engine load exceeds value "b" which is slightly smaller than value "c"; and (iii) if the water temperature is lower than 70 degrees Celsius, the timing of fuel injection begins to gradually increase as the engine load increases after the engine load exceeds value "a" which is the smallest value in the range T.

Also, the timing of fuel injection is gradually retarded as the engine load increases such that:

(i) if the temperature of cooling water is lower than 90 degrees Celsius but not lower than 80 degrees Celsius, the timing of fuel injection is retarded to injection timing u' which is slightly later than injection timing t' (initial value) when the engine load reaches its upper limit in the range T;

(ii) if the water temperature is lower than 80 degrees Celsius but not lower than 70 degrees Celsius, the timing of fuel injection is retarded to injection timing v' which is later than injection timing u' when the engine load reaches its upper limit; and (iii) if the water temperature is lower than 70 degrees Celsius, the timing of fuel injection is retarded to the latest injection timing w' when the engine load reaches its upper limit.

While a plurality of temperature ranges each having a width of 10 degrees Celsius are predetermined so that as the temperature of cooling water falls from one of the temperature ranges to another temperature range in the injection timing adjustment operation range T, the timing of fuel injection by the first fuel injection valve A is advanced or retarded in a stepwise manner, the widths of the temperature ranges are not limited to 10 degrees Celsius, and may be, for example, 5 degrees or 4 degrees Celsius. Also, such temperature ranges may not be set so that the timing of fuel injection is steplessly advanced or retarded in accordance with the temperature of cooling water.

While the present invention is applied to a four-stroke gasoline engine for an automobile in the above embodiments, the present invention may be applied to any different types of engines in which pre-ignition could occur.

DESCRIPTION OF REFERENCE NUMERALS

1: cylinder
2: piston
3: combustion chamber
4: intake passage
5: exhaust passage
6: intake valve
7: exhaust valve
8: intake valve hole
9: exhaust valve hole
10: supercharger
11: direct injection valve (lateral side direct injection valve)
12: port injection valve
13: direct injection valve (overhead direct injection valve)
15: ignition means
20: electronic control unit (ECU)
21: injection ratio determining means
22: injection timing determining means
23: total injection amount determining means
24: operation state judging means
25: cooling water temperature detecting means
A: first fuel injection valve
B: second fuel injection valve

The invention claimed is:

1. An engine control device for controlling an engine including a cylinder, the engine control device comprising:
a first fuel injection valve that injects a first amount of fuel that adheres to an inner peripheral wall of the cylinder;
a second fuel injection valve provided at such a position that a second amount of fuel, injected by the second fuel injection valve, adheres to the inner peripheral wall of the cylinder, the second amount of fuel being smaller than the first amount of fuel;
a cooling water temperature detector for detecting a temperature of cooling water for cooling the engine; and
an injection ratio determining arrangement for determining a ratio between an amount of fuel injected by the first fuel injection valve and an amount of fuel injected by the second fuel injection valve based on the temperature of cooling water detected by the cooling water temperature detector,
wherein the injection ratio determining arrangement stores an injection amount adjustment operation range in which the injection ratio determining arrangement is configured to increase a fuel injection ratio of the amount of fuel injected by the second fuel injection valve with respect to the amount of fuel injected by the first fuel injection valve, as the temperature of cooling water decreases, and
wherein the injection amount adjustment operation range is an operation range of the engine where a low-speed pre-ignition occurs.

2. The engine control device according to claim 1, wherein the injection ratio determining arrangement is configured, in the injection amount adjustment operation range, to increase the fuel injection ratio as an engine load applied to the engine increases.

3. The engine control device according to claim 1, wherein the injection amount adjustment operation range is a low-revolution, high-load operation range of the engine.

4. The engine control device according to claim 3, wherein in the injection amount adjustment operation range, a threshold value of the engine load at which the fuel injection ratio is increased is reduced as the temperature of cooling water falls.

5. The engine control device according to claim 1, wherein the first fuel injection valve comprises a direct injection valve configured to directly inject fuel into a combustion chamber, and
wherein the second fuel injection valve comprises a port injection valve configured to inject fuel into an intake passage leading to the combustion chamber.

6. The engine control device according to claim 1, wherein the first fuel injection valve comprises a lateral side direct injection valve mounted to one of an inner peripheral wall of a combustion chamber and a peripheral edge portion of a top of the combustion chamber on a side of a cylinder head, and configured to directly inject fuel into the combustion chamber, and
wherein the second fuel injection valve comprises an overhead direct injection valve mounted to a center of the top of the combustion chamber on the side of the cylinder head, and configured to directly inject fuel into the combustion chamber.

7. The engine control device according to claim 1, further comprising an injection timing determining arrangement for determining timings of fuel injection by the first fuel injection valve and the second fuel injection valve;
wherein the injection timing determining arrangement stores an injection timing adjustment operation range in which the injection timing determining arrangement is configured to advance the timing of fuel injection by the first fuel injection valve as the temperature of cooling water falls, when injecting fuel during an intake stroke.

8. The engine control device according to claim 7, wherein the injection timing adjustment operation range is a low-revolution, high-load operation range of the engine, and
wherein in the injection timing adjustment operation range, a threshold value of the engine load at which the timing of fuel injection by the first fuel injection valve is advanced is reduced as the temperature of cooling water falls.

9. The engine control device according to claim 1, further comprising an injection timing determining arrangement for determining timings of fuel injection by the first fuel injection valve and the second fuel injection valve;

wherein the injection timing determining arrangement stores an injection timing adjustment operation range in which the injection timing determining arrangement is configured to retard the timing of fuel injection by the first fuel injection valve as the temperature of cooling water falls, when injecting fuel during a compression stroke.

10. The engine control device according to claim 9, wherein the injection timing adjustment operation range is a low-revolution, high-load operation range of the engine, and wherein in the injection timing adjustment operation range, a threshold value of the engine load at which the timing of fuel injection by the first fuel injection valve is retarded is reduced as the temperature of cooling water falls.

11. The engine control device according to claim 2, wherein the injection amount adjustment operation range is a low-revolution, high-load operation range of the engine.

12. The engine control device according to claim 11, wherein in the injection amount adjustment operation range, a threshold value of the engine load at which the fuel injection ratio is increased is reduced as the temperature of cooling water falls.

13. The engine control device according to claim 2, wherein the first fuel injection valve comprises a direct injection valve configured to directly inject fuel into a combustion chamber, and wherein the second fuel injection valve comprises a port injection valve configured to inject fuel into an intake passage leading to the combustion chamber.

14. The engine control device according to claim 2, wherein the first fuel injection valve comprises a lateral side direct injection valve mounted to one of an inner peripheral wall of a combustion chamber and a peripheral edge portion of a top of the combustion chamber on a side of a cylinder head, and configured to directly inject fuel into the combustion chamber, and wherein the second fuel injection valve comprises an overhead direct injection valve mounted to a center of the top of the combustion chamber on the side of the cylinder head, and configured to directly inject fuel into the combustion chamber.

15. The engine control device according to claim 2, further comprising an injection timing determining arrangement for determining timings of fuel injection by the first fuel injection valve and the second fuel injection valve;

wherein the injection timing determining arrangement stores an injection timing adjustment operation range in which the injection timing determining arrangement is configured to advance the timing of fuel injection by the first fuel injection valve as the temperature of cooling water falls, when injecting fuel during an intake stroke.

16. The engine control device according to claim 15, wherein the injection timing adjustment operation range is a low-revolution, high-load operation range of the engine, and wherein in the injection timing adjustment operation range, a threshold value of the engine load at which the timing of fuel injection by the first fuel injection valve is advanced is reduced as the temperature of cooling water falls.

17. The engine control device according to claim 2, further comprising an injection timing determining arrangement for determining timings of fuel injection by the first fuel injection valve and the second fuel injection valve;

wherein the injection timing determining arrangement stores an injection timing adjustment operation range in which the injection timing determining arrangement is configured to retard the timing of fuel injection by the first fuel injection valve as the temperature of cooling water falls, when injecting fuel during a compression stroke.

18. The engine control device according to claim 17, wherein the injection timing adjustment operation range is a low-revolution, high-load operation range of the engine, and wherein in the injection timing adjustment operation range, a threshold value of the engine load at which the timing of fuel injection by the first fuel injection valve is retarded is reduced as the temperature of cooling water falls.

\* \* \* \* \*